April 30, 1940.                W. F. HURLBURT                2,199,178
                          PACKLESS LAMINATED SOLENOID
                            Filed April 7, 1938           2 Sheets-Sheet 1
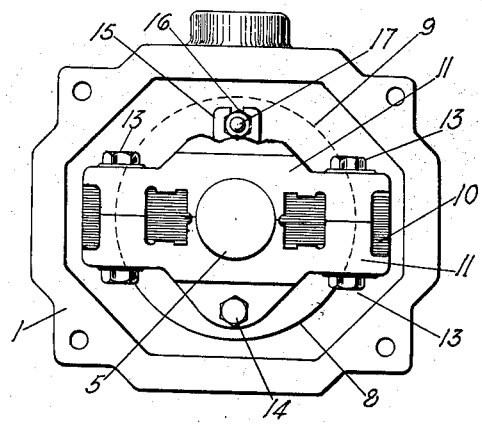
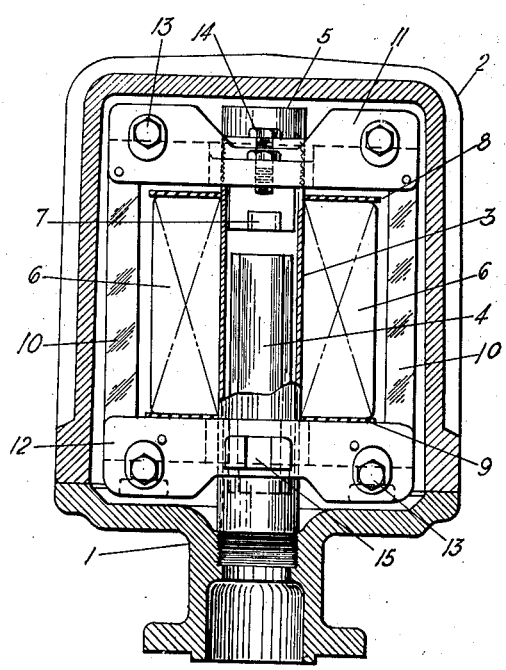
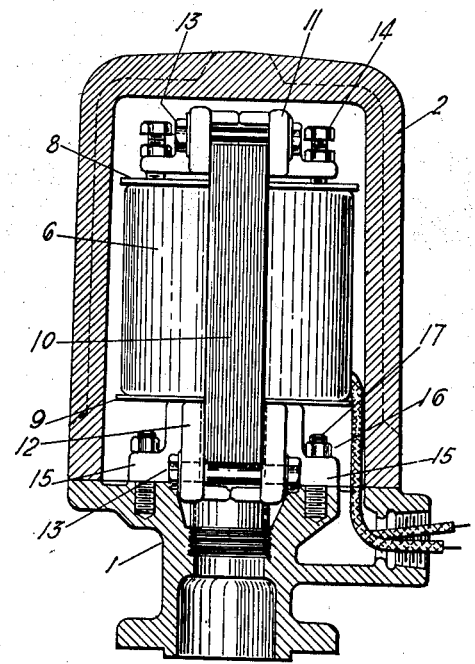
W. F. Hurlburt INVENTOR.
BY  Bordet Bowman
ATTORNEY.

April 30, 1940.　　　W. F. HURLBURT　　　2,199,178
PACKLESS LAMINATED SOLENOID
Filed April 7, 1938　　　2 Sheets-Sheet 2

W. F. Hurlburt INVENTOR.
BY Bordett Bowman
ATTORNEY.

Patented Apr. 30, 1940

2,199,178

UNITED STATES PATENT OFFICE 2,199,178

PACKLESS LAMINATED SOLENOID

Wilbur F. Hurlburt, East Orange, N. J.

Application April 7, 1938, Serial No. 200,626

2 Claims. (Cl. 175—341)

This invention covers improvements on the form of solenoid commonly used for operating packless valve mechanisms and which by virtue of the same improvements permits a broader use of said form of solenoid for operating mechanisms in explosive or inflammable atmospheres. These solenoids are commonly called "packless" and "explosionproof" types.

In the general class of solenoid operated valves, there are two types—one known as the packless type, a form of valve from which is eliminated all packing or sealing devices on the stem, for prevention of leakage from valve to surrounding atmosphere or interior of the operating solenoid—the other, the packed type which has packing around a sliding or rotary stem to prevent leakage.

In the packless form of valve, the solenoid core is connected to the valve stem in such manner as to cause operation of the valve when the core is moved longitudinally.

The solenoid core is enclosed by an impervious tube, closed at one end, having its open end attached to the valve body bonnet in a leak-proof manner. The core, therefore, occupies a chamber forming an extension of the valve body in which it is free to move longitudinally. Fluid contained in the valve casing surrounds the core but is prevented from escaping by the surrounding tube and its attachment to valve body.

The solenoid coil surrounds the tube and is, in turn, enclosed by magnetic material which, with the core, forms a magnetic circuit capable of moving the core and thus operating the valve when the coil is energized.

From the above description, it will be apparent that packless solenoid operated valves are of great value, first because stem packing friction is eliminated, second, freedom from possible leakage past packing permits their use with inflammable fluids, and third, reduction of cost due to elimination of packing.

The use of packless solenoid valves has been greatly restricted by the inherently limited mechanical power available with the packless type solenoids heretofore used, due to the improper distribution of the flux, it often being necessary to use packed type valves with their attendant disadvantages and higher costs, because of the fact that the solenoids used on packed valves can be made large enough to deliver any amount of mechanical power required.

As an example of the value of the invention:

A certain 2" packless solenoid operated valve with the present solenoid is limited to a maximum operating pressure of 60 pounds. If the operating pressure be 150 pounds, it is now customary to use a packed type valve costing 40% more. My invention will permit the packless valve to be rated 150 pounds at only 15% greater cost and with advantages of the packless valve retained.

Explosionproof solenoids are also advantageously made of the same form as solenoids used on packless type valves. This contruction permits the solenoid core to be directly attached to the mechanism to be operated without an intervening stuffing box for packing.

The impervious core tube, together with the enclosing case, can easily be made of explosion proof construction.

By combining the leak-proof and explosion-proof tube mounted in a suitable base, with my improved laminated external magnetic structure, hereinafter described, the same advantages of increased available mechanical power are secured with alternating current.

As commonly constructed, the packless and explosionproof solenoids referred to, are made with the external magnetic circuit parts formed of solid metal. This construction materially limits the mechanical power which may be secured from such a device when used with alternating current because of the inherent power losses due to the presence of solid metal in an alternating current magnetic field.

The losses referred to, rapidly increase with size of the parts. With small solenoids, they are a comparatively small proportion of the total power available and, consequently, small solenoids with solid metal external magnetic circuits are practicable. However, an attempt to secure relatively large amounts of mechanical power from such alternating current solenoids results in failure because increasing the area of the magnetic circuit to pass the higher value of flux required for more power, results in increasing the losses by far greater values than the gain in mechanical power secured. The solenoid is therefore larger and more expensive and consumes much more electrical energy without any material increase in the available mechanical power.

My invention consists in retaining the packless solenoid features and combining with same, parts forming an improved magnetic circuit, which is made largely of laminated magnetic material. The general object of the invention is to improve the distribution of the flux and materially reduce the alternating current losses and leakages thereby permitting packless solenoids to be constructed economically of any size required for the mechanical power needed; also to provide a construction of laminated solenoid that is adapted for use with solid metal enclosures required for mechanical protection, waterproofing or explosionproofing. This is brought about by the proper distribution of the magnetic flux, due to the fact that in my improved device the magnetic field of a properly arranged magnetic circuit is retained within its members thereby reducing the magnetic leakage to a minimum. Another general object is to provide a construction in which the assembling of parts is improved due to the fact that the coil, laminations, clamping and supporting devices constitute a unitary portable device capable of being readily secured to the bonnet, the tube being first secured to the bonnet as a separate unit, which provides a subassembly for convenient manufacturing operations and permits the coil to be replaced without taking the valve out of the pipe line or causing leakage of fluid contained therein.

Other objects and advantages will be in part indicated in the following description and in part rendered apparent therefrom in connection with the annexed drawings.

To enable others skilled in the art to fully apprehend the underlying features hereof that they may embody the same in the various ways contemplated by this invention, drawings depicting a preferred typical construction have been annexed as a part of this disclosure and, in such drawings like characters of reference indicate corresponding parts throughout all the views of which:

Figure 1 is a top plan view.

Figure 2 is a longitudinal sectional view, tube 3 being cut away to show the interior thereof.

Figure 3 is a side view.

Figure 4:
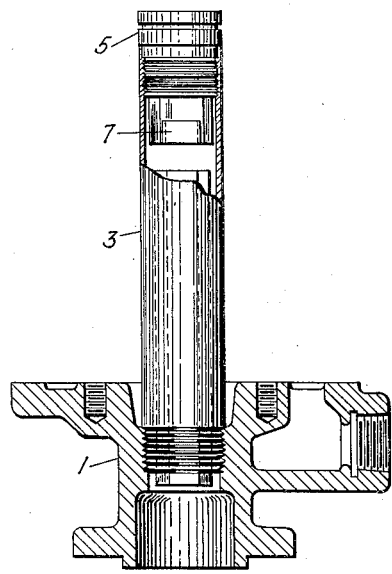
Figures 4 and 5 are detail views of the separate units, tube 3 being cut away in Figure 4 to show the interior construction.
Figure 5:
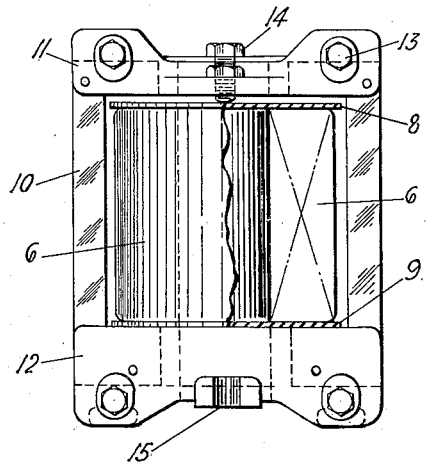
Figure 6:
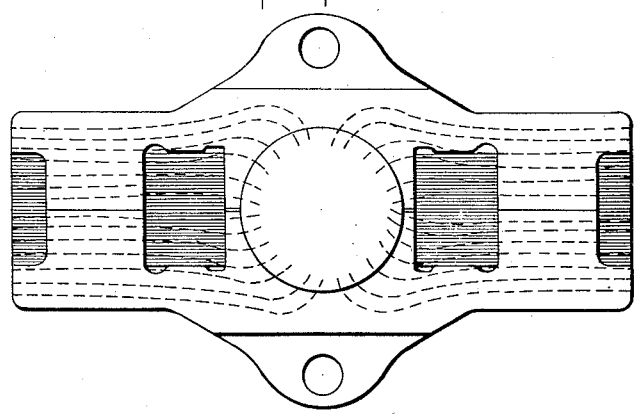
Figure 6 is a diagrammatic view of the flow of the flux.

Referring to Figures 1 and 2 the casting for the fluid passage is marked 1 and the outside casing is marked 2 and may be much thicker than as shown in Fig. 2 to constitute an explosionproof chamber.

The packless solenoid has the hollow tube 3 which is positioned so that the end portions of tube 3 form air gaps in the magnetic circuit but the movable core or plunger 4 will be capable of controlling the opening and closing of a valve (not shown) which will in turn control the fluid passage. The fixed core 5 is secured within the tube 3 near its closed end. The coil for the alternating current is indicated by 6. The shading coil 7 is positioned within a recess formed in the fixed core 5. The insulating washers 8 and 9 cause the coil 6 to be securely held within the seat formed by the extensions of the laminations 10. These magnet laminations are C shaped or of yoke like form having polar extensions adjacent the outer periphery of the hollow tube, the extensions forming a seat for the coil 6. The upper clamping member 11 and the lower clamping member 12 are of solid metal construction completely encompassing tube 3 as shown in Fig. 1 and co-operate with the other parts of the solenoid to produce the following desirable results.

(1st) They act as magnetic conductors forming with the laminations a closed circuit which distributes the flux evenly around the entire circumference of the tube thereby reducing the density of the flux through the air gap of the tube and, as shown in Figure 1, there are two sets of laminations positioned at diametrically opposite sides of the tube, the clamps functioning to form a path for the flux thereby distributing it as aforesaid, which enables me to form an economical construction of laminated solenoid having an improved distribution of the flux through these clamping members, which reduces the magnetic losses and leakage to a minimum.

(2nd) The clamps compress the laminations of the solenoid.

(3rd) The clamps operate to clamp the coil washers and laminations securely together, permitting the parts as a unitary structure to be slid upon the tube after tube has been secured to the fluid passage casting.

There are two sets of clamps and each set has bolts 13 which bolt the bars together, the coil, laminations, washers and clamps constituting a portable unitary structure.

The insulating washer 9 is positioned on the lower clamping bar 12, the coil 6 being positioned to rest upon same while the insulating washer 8 is positioned to bear upon the top of said coil and the bolts 14 extend through flanges projecting from the upper clamping bar 11 and force the washer 8 downwardly against the coil 6. The lower clamping bar 12 has flanges 15 and the nuts 16 and studs 17 constitute securing means for attaching the above mentioned portable solenoid structure to the fluid passage casting 1. It is apparent that the parts co-operate to prevent losses and leakage of the magnetic flux into any enclosing casing or any closure for mechanical protection or explosionproof features and at the same time present an economical, efficient and desirable form of construction for assembly purposes.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and therefore, such adaptations should be, and are intended to be, comprehended within the meaning and range of equivalency in the following claims:

Having thus revealed this invention, I claim as new and desire to secure the following combinations and elements, or equivalents thereof, by Letters Patent of United States:

1. A packless solenoid consisting of two separable unitary members, one member comprising pairs of upper and lower magnetic conductors, each pair capable of being clamped together with a central opening therein, an electric coil having a central passage positioned between the upper and lower conductors and being clamped to said upper and lower conductors, said central passage being in alignment with said central opening formed by said conductors, the conductors and coil forming a central passage extending through said solenoid, a series of laminations having their upper and lower ends clamped between each pair of conductors and their body portions with said conductors encircling said coil, the said laminations and conductors thereby constituting a flux distributor, the other member of said solenoid comprising a bonnet or base having seats formed thereon, an impervious tube forming a rigid fluid container projecting from said bonnet, a solenoid plunger positioned within said container, the said first mentioned unitary member being slidably mounted upon the second mentioned member, the tube of the second member forming a central bearing for the coil and conductors, flanges projecting from the lower conductors fitting the seats of the said bonnet and means for securing said flanges to said seats, said first mentioned member being removable from the other member by unfastening said securing means.

2. A packless solenoid consisting of two separable unitary members, one member comprising pairs of upper and lower magnetic conductors, each pair capable of being clamped together with a central opening therein, an electric coil having a central passage positioned between the upper and lower conductors and the coil slidably mounted between the conductors, said central passage being in alignment with said central opening formed by said conductors, the conductors and coil forming a central passage extending through said solenoid, a series of laminations having their upper and lower ends clamped between each pair of conductors and their body portions with said conductors encircling said coil, the said laminations and conductors thereby constituting a flux distributor, the other member of said solenoid comprising a bonnet or base having seats formed thereon, an impervious tube forming a rigid fluid container projecting from said bonnet, a solenoid plunger positioned within said container, the said first mentioned unitary member being slidably mounted upon the second mentioned member, the tube of the second member forming a central bearing for the coil and conductors, flanges projecting from the lower conductors fitting the seats of the said bonnet and means for securing said flanges to said seats, said first mentioned member being removable from the other member by unfastening said securing means.

WILBUR F. HURLBURT.